United States Patent [19]

Notaro

[11] Patent Number: 5,395,196
[45] Date of Patent: Mar. 7, 1995

[54] TWO-PIECE LUG BOLT

[75] Inventor: David F. Notaro, Amherst, N.Y.

[73] Assignee: McGard, Inc., Orchard Park, N.Y.

[21] Appl. No.: 199,548

[22] Filed: Feb. 22, 1994

Related U.S. Application Data

[63] Continuation-in-part of Ser. No. 85,325, Jun. 30, 1993, Pat. No. 5,324,148.

[51] Int. Cl.$^6$ .................... F16B 23/00; F16B 35/06
[52] U.S. Cl. ................................. 411/396; 411/373; 411/919
[58] Field of Search .................. 411/2, 3, 5, 383, 396, 411/397, 372–376, 429–431, 919

[56] References Cited

U.S. PATENT DOCUMENTS

| | | | |
|---|---|---|---|
| 2,503,189 | 4/1950 | Biba, Jr. | 411/396 X |
| 4,460,300 | 7/1984 | Bettini et al. | 411/375 |
| 4,759,672 | 7/1988 | Nilsen et al. | 411/375 |
| 4,764,070 | 8/1988 | Baltzell et al. | 411/375 X |
| 4,955,773 | 9/1990 | Toth | 411/376 X |

FOREIGN PATENT DOCUMENTS

| | | | |
|---|---|---|---|
| 1512400 | 2/1968 | France | 411/396 |
| 1119864 | 7/1968 | United Kingdom | 411/397 |
| 1408532 | 10/1975 | United Kingdom | 411/377 |

*Primary Examiner*—Neill R. Wilson
*Attorney, Agent, or Firm*—Joseph P. Gastel

[57] ABSTRACT

A two-piece lug bolt including a shank having first and second end portions and a central portion therebetween, a thread on the first end portion, a first flange of larger diameter than both the first and second end portions located on the central portion of the shank, a head, a first wrench-receiving portion on the head for receiving a wrench, a bore in the head for receiving the second end portion of the shank with a press-fit, a second flange on the head which is of larger diameter than the wrench-receiving portion and substantially the same diameter as the first flange and located in contiguous relationship to the first flange and in bearing relationship therewith, and a second wrench-receiving portion on the shank located between the first flange and the second end portion of the shank and positioned within the head.

25 Claims, 2 Drawing Sheets

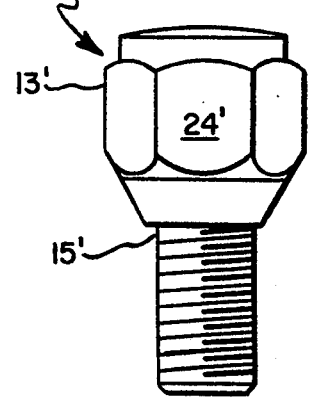
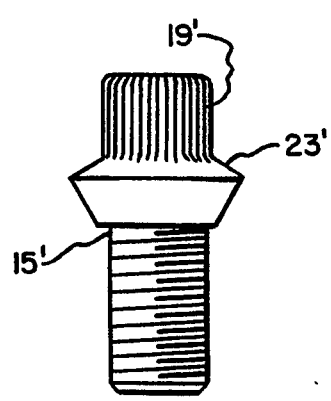
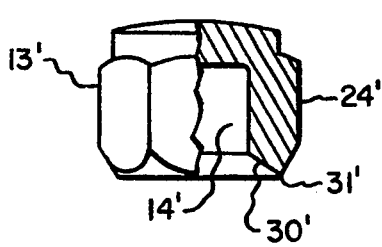
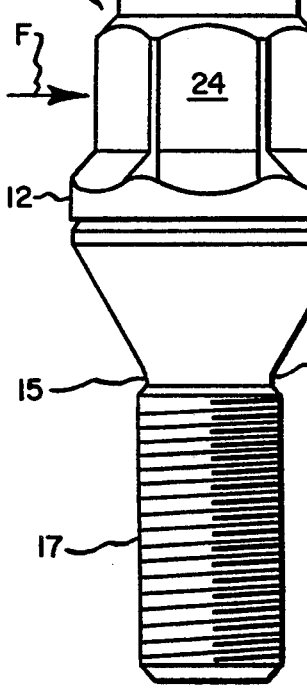
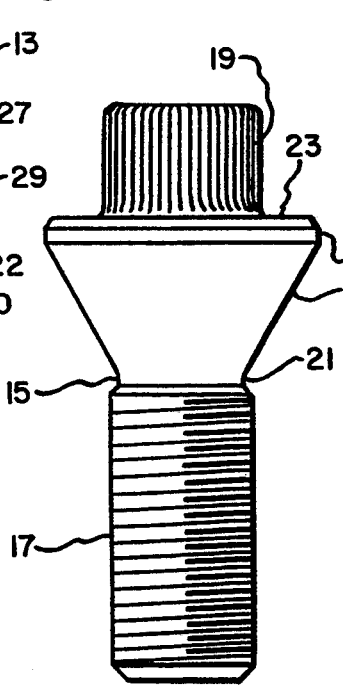
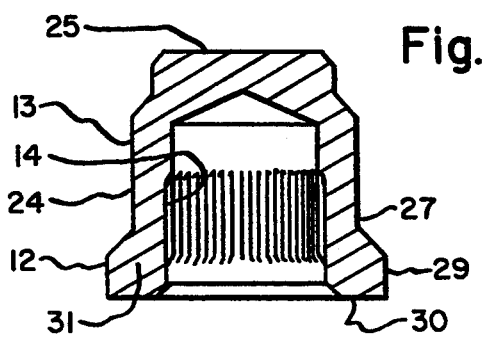
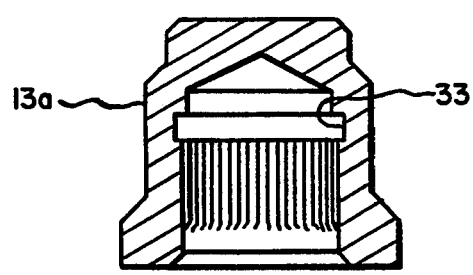

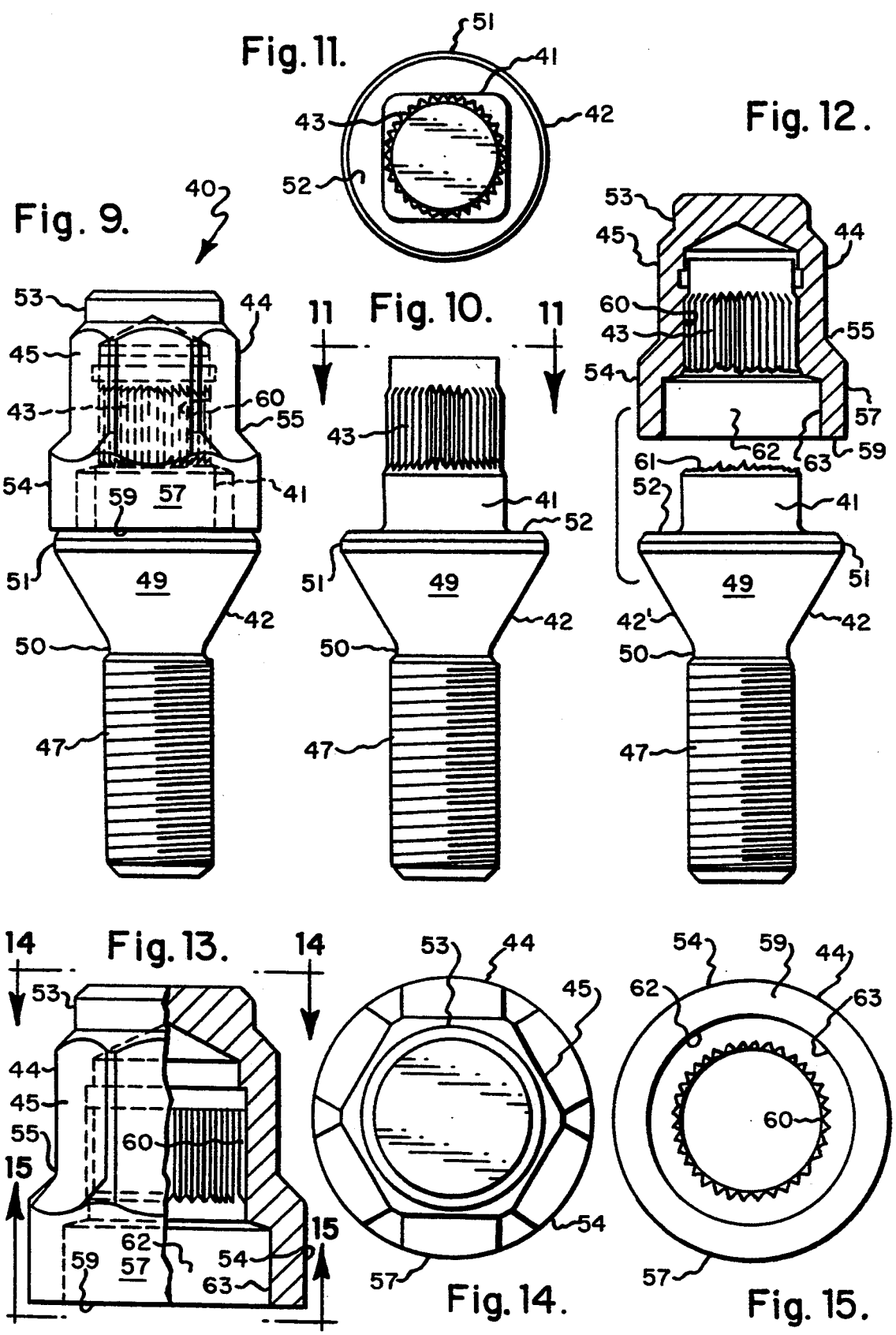

TWO-PIECE LUG BOLT

CROSS REFERENCE TO RELATED APPLICATIONS

The present application is a continuation-in-part of patent application Ser. No. 08/085,325, filed Jun. 30, 1993, now U.S. Pat. No. 5,324,148, issued 6/28/94.

BACKGROUND OF THE INVENTION

The present invention relates to an improved two-piece lug bolt.

In the past, two-piece lug bolts have been fabricated for the purpose of permitting the head to be made of a different material than the remainder of the shank. One embodiment of a prior two-piece lug bolt is disclosed in the drawings accompanying the present specification, and the various embodiments of the improved lug bolts of the present invention have certain advantages. The superiority of the embodiment of FIGS. 1-8 is fully discussed hereafter and is the subject of application Ser. No. 08/085,325, filed Jun. 30, 1993, now U.S. Pat. No. 5,324,148, issued 6/28/94. The improved embodiment of FIGS. 9-15 of the present invention incorporates all of the improvements of FIGS. 1-8. In addition, in prior two-piece bolts, if the wrench grippable head broke off, there was no structure remaining which could be gripped by a wrench to remove the remainder of the bolt from an installed condition. It is with overcoming this deficiency that the present invention is concerned.

SUMMARY OF THE INVENTION

It is a primary object of the present invention to provide an improved two-piece lug bolt which includes a concealed wrench-grippable portion which can be gripped by a wrench to remove the bolt from an installed condition in the event the bolt head is broken from the remainder of the bolt.

Another object of the present invention is to provide an improved two-piece lug bolt which has greater stability against lateral forces applied to the head thereof than prior two-piece lug bolts.

A further object of the present invention is to provide an improved two-piece lug bolt wherein the bore in the head and the head-receiving portion of the shank are both knurled to provide a uniform and evenly distributed press-fit therebetween. Other objects and attendant advantages of the present invention will readily be perceived hereafter.

The present invention relates to a two-piece lug bolt comprising a shank having first and second end portions and a central portion therebetween, a thread on said first end portion, a head, a first wrench-receiving portion on said head for receiving a wrench, a bore in said head for receiving said second end portion with a press fit, and a second wrench-receiving portion formed integrally with said shank and located on said central portion between said thread and said second end portion of said shank.

The various aspects of the present invention will be more fully understood when the following portions of the specification are read in conjunction with the accompanying drawings wherein:

BRIEF DESCRIPTION OF THE DRAWINGS

FIG. 1 is a side elevational view of a prior art two-piece lug bolt;

FIG. 2 is a side elevational view of the shank of the prior art lug bolt;

FIG. 3 is a fragmentary side elevational view of the head of the two-piece prior art lug bolt;

FIG. 4 is a side elevational view of the improved two-piece lug bolt of the present invention;

FIG. 5 is a side elevational view of the shank of the lug bolt of FIG. 4;

FIG. 6 is a fragmentary side elevational view of the head of the lug bolt of FIG. 4;

FIG. 7 is a cross sectional view of the head of the lug bolt of FIG. 4;

FIG. 8 is a cross sectional view of a modified form of head which can be used on the lug bolt of FIG. 4;

FIG. 9 is a side elevational view of another embodiment of the present invention which possesses a second wrench-receiving portion within the head for use in the event that the head breaks off;

FIG. 10 is a side elevational view of the shank portion of the bolt of FIG. 9;

FIG. 11 is a plan view taken substantially in the direction of arrows 11—11 of FIG. 10;

FIG. 12 is an exploded side elevational view, partially in cross section, showing the second wrench-receiving portion exposed if the head breaks off of the shank;

FIG. 13 is an enlarged side elevational view, partially in cross section, of the head of the lug bolt;

FIG. 14 is a plan view of a head taken substantially in the direction of arrows 14—14 of FIG. 13; and FIG. 15 is a bottom plan view of the head taken substantially in the direction of arrows 15—15 of FIG. 13.

DESCRIPTION OF THE PREFERRED EMBODIMENTS

The advantages of the improved two-piece lug bolts 10 and 40 of the present invention will be more fully appreciated when they are compared to the prior lug bolt 11 of FIG. 1. Summarizing in advance, the improvement of lug bolt 10 includes a flange 12 on the head 13 and a knurl 14 in the head. Similar structure is also on bolt 40. The flange 12, as more fully discussed hereafter, stabilizes the head against splitting and cocking when a lateral force, as depicted by arrow F, is applied thereto. Additionally, lug bolt 40 has a second wrench-receiving portion for use in removing the bolt from an installed condition in the event the primary wrench-receiving portion is broken off of the remainder of the bolt.

The improved two-piece lug bolt 10 of FIGS. 4-8 includes a shank 15 having a threaded end portion 17, a knurled end portion 19, and a flange 20 therebetween. Flange 20 is shown as being frustoconical, but it may be spherical or of any other configuration for providing a bearing surface against a body such as a vehicle rim. The smaller base 21 of flange 20 is adjacent the threaded end portion 17, and the larger base 22 of flange 20 is adjacent knurled end portion 19. Base 22 terminates at an annular flat surface 23. The head 13 has a hexagonal wrench-receiving portion 24 and a substantially cylindrical crown 25. Flange 12 of head 13 flares outwardly from the end 27 of wrench-receiving portion 24 and terminates at a substantially cylindrical portion 29 which has a substantially annular planar surface 30 thereon.

During the assembling of head 13 onto shank 15, the knurled portion 14 of head 13 intermeshes with knurled end portion 19 of shank 15 to provide a uniform and evenly distributed press-fit therebetween. The existence of knurls on both parts also obviates the shaving of an inner portion of head 13, which would occur if the inner portion, such as 14' of prior art head 13', is not knurled as it is placed on knurled end portion 19' of prior art shank 15'. The fact that a non-knurled head, such as 13', is placed on a knurled portion, such as 19', does cause shaving, which is undesirable.

When head 13 is fully seated on knurled end portion 19, flat annular surface 30 of head 13 will bear against flat annular surface 23 of flange 20. This bearing relationship stabilizes head 13 against cocking resulting from lateral forces, such as F, applied to head 13. This relationship is not capable of achievement in the prior art two-piece lug bolt 11 which does not have the additional flange 12 of head 13. Furthermore, it can be seen that the flange 12 has a thickened area at 31 whereas the base of prior art head 13' does not have this. In contrast, the base 30' of prior head 13' comes to a point at 31' so that there is more of a possibility of head 13' splitting when lateral forces, such as F, are applied to head 13'. Furthermore, the annular surface 30' of prior art head 13' bears against frustoconical surface 23' of shank 15'. However, this bearing area lies entirely radially within the wrench-receiving portion 24' of head 13' whereas in the device of FIGS. 4–7, a portion of the bearing area between portions 23 and 30 lies radially outwardly of the wrench-receiving portion 24, and thus this configuration provides greater resistance to lateral displacement of head 13 when subjected to side forces such as F.

In FIG. 8 a modified head 13a is shown which is identical in all respects to head 13 except that it is machined whereas head 13 is cold-headed. Head 13a contains an annular groove 33 therein. Otherwise, it is identical to head 13.

In FIGS. 9–15 another two-piece lug bolt 40 is disclosed which has an added feature over the lug bolt 10 disclosed in the preceding figures. The added feature is that it contains a second wrench-receiving portion 41 formed as an integral part of shank 42 which permits the lower portion 42' of the shank 42 shown in FIG. 12 to be turned in the event that the knurled end portion 43 is for any reason broken from the remainder of shank 42 along with head 44, which has the primary wrench-receiving portion 45 thereon. Thus the second wrench-receiving portion 41 can be used to remove the lower portion of shank 42 from an installed condition.

In its more specific aspects, the improved two-piece lug bolt 40 includes a shank 42 having a threaded end portion 47, a knurled end portion 43, a flange 49 and a wrench-receiving portion 41 formed integrally with shank 42 and located between flange 49 and knurled portion 43. Flange 49 is shown as being frustoconical, but it may be spherical or of any other configuration for providing a bearing surface against a body such as a vehicle rim. The smaller base 50 of flange 49 is adjacent the threaded end portion 47, and the larger base 51 of flange 49 is adjacent wrench-receiving portion 41. Base 51 terminates at an annular flat surface 52.

The head 44, as noted above, has a primary hexagonal wrench-receiving portion 45 and a substantially cylindrical crown 53. Flange 54 of head 44 flares outwardly from the end 55 of wrench-receiving portion 45 and terminates at a substantially cylindrical portion 57 which has a substantially annular planar surface 59 thereon which bears against substantially annular planar surface 52 of shank 42 when the head 44 is in fully assembled position on shank 42.

During the assembling of head 44 onto shank 42, the knurled portion 60 of head 44 intermeshes with knurled end portion 43 of shank 42 to provide a uniform and evenly distributed press-fit therebetween. As expressed above relative to FIGS. 4–8, the existence of knurls on both parts also obviates the shaving of an inner portion of head 44, which would occur if the knurl was not present at 60.

The two-piece lug bolt 40, in fully assembled condition, has all of the advantages of the two-piece lug bolt of FIGS. 4–8, as set forth above in the full paragraph preceding the paragraph which describes FIG. 8, and these advantages will not be again set forth here in the interest of brevity.

The embodiment of FIGS. 9–15 has the additional advantage of providing a second wrench-receiving portion 41 integral with shank 42 for removing the remaining portion 42' (FIG. 12) of shank 42 from an installed condition in the event the head 44 breaks off of shank 42 along with the knurled end portion 43, with the break occurring at the junction 61 between secondary wrench-receiving portion 41 and knurled end 43. If a break should occur so as to separate the head 44 from shank 42, as described above, this break will occur at junction 61 because wrench-receiving portion 41 is larger in cross area and stronger than the knurled end portion 43. Thus, if the break should occur and head 44 falls off, the wrench-receiving portion 41 will be exposed for receiving a wrench to remove the remaining portion 42' of shank 42 from an installed condition.

When head 44 is in its fully installed position on shank 42, wrench-receiving portion 41 is housed within chamber or counterbore 62 of head 44. As can be seen from FIG. 11, wrench-receiving portion 41 is square, and as can be seen from FIGS. 13 and 15, counterbore 62 is cylindrical. The dimensions are such that there is a clearance between wrench-receiving portion 41 and the wall 63 of counterbore 62 so that there is no turning relationship therebetween. More specifically, for example, in a designed bolt, the diagonal dimension of wrench-receiving portion 41 is 0.694 inches, whereas the diameter of counterbore 62 is 0.700 inches.

While the type of fracture shown in FIG. 12 is highly unlikely, if in fact it should occur, the secondary wrench-receiving portion 41 will be exposed for receiving a wrench for removing the remaining portion 42' of shank 42 from an installed condition.

It can thus be seen that the improved two-piece lug bolt of the present invention is manifestly capable of achieving the above enumerated objects, and while preferred embodiments of the present invention have been disclosed, it will be appreciated that it is not limited thereto but may be otherwise embodied within the scope of the following claims.

What is claimed is:

1. A two-piece lug bolt comprising a shank having first and second end portions and a central portion therebetween, a thread on said first end portion, a head, a first wrench-receiving portion on said head for receiving a wrench, a bore in said head for receiving said second end portion with a press fit, and a second wrench-receiving portion formed integrally with said shank and located on said central portion between said thread and said second end portion of said shank.

2. A two-piece lug bolt as set forth in claim 1 wherein said second wrench-receiving portion is located within said bore and becomes exposed if there is a break in said shank between said second wrench-receiving portion and said second end portion.

3. A two-piece lug bolt as set forth in claim 2 wherein said bore in said head includes a first bore which receives said second end portion with said press fit, and a second bore of larger diameter than said first bore for receiving said second wrench-receiving portion.

4. A two-piece lug bolt as set forth in claim 3 wherein said second bore is sufficiently larger than said second wrench-receiving portion to provide a clearance therebetween.

5. A two-piece lug bolt as set forth in claim 4 wherein said second wrench-receiving portion is larger in cross-section than said second end portion.

6. A two-piece lug bolt as set forth in claim 1 wherein said second wrench-receiving portion is larger in cross-section than said second end portion.

7. A two-piece lug bolt as set forth in claim 6 wherein said bore in said head includes a first bore which receives said second end portion with said press fit, and a second bore of larger diameter than said first bore for receiving said second wrench-receiving portion.

8. A two-piece lug bolt as set forth in claim 7 wherein said second bore is sufficiently larger than said second wrench-receiving portion to provide a clearance therebetween.

9. A two-piece lug bolt as set forth in claim 1 including a first flange on said shank between said thread and said second wrench-receiving portion, a second flange on said head, said second flange being of larger diameter than said first and second wrench-receiving portions and located in contiguous relationship to said first flange.

10. A two-piece lug bolt as set forth in claim 9 wherein said first flange is frustoconical and has a smaller base proximate said thread and a larger base proximate said second wrench-receiving portion, and wherein said second flange flares outwardly from said first wrench-receiving portion toward said first flange.

11. A two-piece lug bolt, as set forth in claim 10 wherein said first and second flanges have substantially the same maximum diameter.

12. A two-piece lug bolt as set forth in claim 10 wherein said first and second flanges have abutting surfaces proximate the portion of said second wrench-receiving portion which is remote from said second end portion.

13. A two-piece lug bolt as set forth in claim 1 including knurl means between said bore in said head and said second portion of said shank.

14. A two-piece lug bolt as set forth in claim 13 wherein said knurl means comprise a first knurl in said bore and a second knurl on said second portion of said shank.

15. A two-piece lug bolt as set forth in claim 14 including a first flange on said shank between said thread and said second wrench-receiving portion, a second flange on said head, said second flange being of larger diameter than said first and second wrench-receiving portions and located in contiguous relationship to said first flange, and wherein said first flange is frustoconical and has a smaller base adjacent said first portion of said shank, and wherein said second flange flares outwardly from said wrench-receiving portion toward said first flange.

16. A two-piece lug bolt as set forth in claim 15 wherein said first and second flanges have substantially the same maximum diameter.

17. A two-piece lug bolt as set forth in claim 1 including a first flange located on said shank between said thread and said second wrench-receiving portion, a second flange on said head, said second flange being of larger diameter than said first and second wrench-receiving portions and located in contiguous relationship to said first flange, and wherein said first flange terminates at a first flat annular surface, and wherein said second flange terminates at a second flat annular surface which bears against said first flat annular surface.

18. A two-piece lug bolt comprising a shank having first and second end portions and a central portion therebetween, a thread on said first end portion, a first flange of larger diameter than both said first and second end portions located on said central portion of said shank, a head, a first wrench-receiving portion on said head for receiving a wrench, a first bore in said head for receiving said second end portion with a press fit, a second flange on said head, said second flange being of larger diameter than said wrench-receiving portion and located in contiguous relationship to said first flange, said first flange having a smaller base adjacent said first portion of said shank, said second flange flaring outwardly from said wrench-receiving portion toward said first flange, said first and second flanges having substantially the same maximum diameter, a second wrench-receiving portion on said shank located between said first flange and said second end portion of said shank, and a second bore in said head in which said second wrench-receiving portion is located.

19. A two-piece lug bolt as set forth in claim 18 wherein said second bore is sufficiently larger than said second wrench-receiving portion to provide a clearance therebetween.

20. A two-piece lug bolt as set forth in claim 19 wherein said first flange terminates at a first flat annular surface, and wherein said second flange terminates at a second flat annular surface which bears against said first flat annular surface.

21. A two-piece lug bolt comprising a shank having first and second end portions and a central portion therebetween, a thread on said first end portion,.a first flange of larger diameter than both said first and second end portions located on said central portion of said shank, a head, a first wrench-receiving portion on said head for receiving a wrench, a bore in said head for receiving said second end portion with a press fit, a second flange on said head, said second flange being of larger diameter than said wrench-receiving portion and located in contiguous relationship to said first flange, knurl means between said bore in said head and said second portion of said shank, a second wrench-receiving portion on said shank located between said first flange and said second end portion of said shank, and a second bore in said head in which said second wrench-receiving portion is located.

22. A two-piece lug bolt as set forth in claim 21 wherein said second bore is sufficiently larger than said second wrench-receiving portion to provide a clearance therebetween.

23. A two-piece lug bolt as set forth in claim 22 wherein said knurl means comprise a first: knurl in said bore and a second knurl on said second portion of said shank.

24. A two-piece lug bolt comprising a shank having first and second end portions and a central portion therebetween, a thread on said first end portion, a first flange of larger diameter than both said first and second end portions located on said central portion of said shank, a head, a wrench-receiving portion on said head for receiving a wrench, a first bore in said head for receiving said second end portion with a press fit, a second flange on said head, said second flange being of larger diameter than said wrench-receiving portion and located in contiguous relationship to said first flange, said first flange terminating at a first flat annular surface, said second flange terminating at a second flat annular surface which bears against said first flat annular surface, a second wrench-receiving portion on said shank located between said first flange and said second end portion of said shank, and a second bore in said head in which said second wrench-receiving portion is located.

25. A two-piece lug bolt as set forth in claim 24 wherein said second bore is sufficiently larger than said second wrench-receiving portion to provide a clearance therebetween.

* * * * *